(12) United States Patent
Scholte-Wassink

(10) Patent No.: US 7,805,893 B2
(45) Date of Patent: Oct. 5, 2010

(54) PREASSEMBLED TOWER SECTION OF A WIND POWER PLANT

(75) Inventor: Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 12/035,106

(22) Filed: Feb. 21, 2008

(65) Prior Publication Data

US 2009/0211172 A1 Aug. 27, 2009

(51) Int. Cl.
*F03D 11/00* (2006.01)
(52) U.S. Cl. ............................................. 52/40; 290/55
(58) Field of Classification Search ................... 290/55; 52/40
See application file for complete search history.

(56) References Cited

U.S. PATENT DOCUMENTS

| | | | | |
|---|---|---|---|---|
| 6,400,039 | B1 * | 6/2002 | Wobben | 290/44 |
| 6,782,667 | B2 * | 8/2004 | Henderson | 52/116 |
| 7,234,409 | B2 * | 6/2007 | Hansen | 114/258 |
| 7,276,808 | B2 * | 10/2007 | Weitkamp et al. | 290/55 |
| 2007/0125037 | A1 * | 6/2007 | Meiners | 52/720.1 |
| 2007/0296220 | A1 * | 12/2007 | Kristensen | 290/55 |
| 2009/0223139 | A1 * | 9/2009 | Meiners | 52/40 |
| 2010/0139180 | A1 * | 6/2010 | Meiners | 52/111 |

FOREIGN PATENT DOCUMENTS

| JP | 2009197802 A | * | 9/2009 |
|---|---|---|---|
| WO | WO 2004067959 A1 | * | 8/2004 |

* cited by examiner

*Primary Examiner*—Joseph Waks
(74) *Attorney, Agent, or Firm*—Global Patent Operation; Douglas D. Zhang

(57) ABSTRACT

The present invention relates to a preassembled tower section of a wind power plant and a method of transporting a tower section of a wind power plant, the method comprising the steps providing the tower section at a preassembly site, preassembling at least one electronic subsystem of the wind power plant onto the tower section, transporting the preassembled tower section from the preassembly site to an installation site. In effect transport thereof is considerably simplified and a higher degree of modular design and preassembly is achieved.

20 Claims, 3 Drawing Sheets

PREASSEMBLED TOWER SECTION OF A WIND POWER PLANT

BACKGROUND OF THE INVENTION

The present invention relates to wind turbines and wind power plants. Particularly, the invention relates to a method of transporting a tower section of a wind power plant and to a tower section of a wind power plant.

Wind power plants and wind turbines increase in size and dimension. Usually, system components such as power electronic boards, switch boards, electronic cabinets or transformers as well as other bulky elements of a wind power plant such as a tower section of the wind power plant to which a nacelle is attached at its top, as well as other components (such as a wind turbine drive train or the generator) are transported as individual units from a fabrication side to an installation side of the wind power plant where the units are assembled. Due to the increasing size of the respective units, transporting the bulky components of a wind power plant from a fabrication site to an installation site is cumbersome and expensive.

SUMMARY OF THE INVENTION

In view of the above, according to one embodiment, a method of transporting a tower section of a wind power plant comprises the steps: providing the tower section at a preassembly site, preassembling at least one electronic subsystem of the wind power plant onto the tower section, and transporting the preassembled tower section from the preassembly site to an installation site.

A further embodiment relates to a tower section of a wind power plant that comprises a tubular section, at least one electronic subsystem, and support structures, wherein the tower section is preassembled and the at least one electronic subsystem is attached to the interior of the tubular section by the support structures, wherein the tower section is transportable.

Further embodiments, aspects, advantages and features which can be applied individually or in any suitable combination are apparent from the dependent claims, the description and the accompanying drawings.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Due to the large size and heavy weight of modern wind power plants that have been increasing in size, volume and weight over the past years, the costs for transportation have steadily increased and form a substantial portion of the overall costs of a wind power plant. Furthermore, as the various system components are commonly assembled at an installation site of the wind power plant, highly trained personal is required to assist the assembly of the wind power plant at the installation site during the process of installing.

According to the embodiment the method of transporting a tower section of a wind power plant comprises the steps: providing the tower section at a preassembly site, preassembling at least one electronic subsystem of the wind power plant onto the tower section, and transporting the preassembled tower section from the preassembly site to an installation site.

The term "electronic subsystem" in the meaning of this application denotes bulky, spacious and/or heavy electronic modules such as power electronic boards, control electronic boards, switch boards, electronic cabinets, transformers, power rectifiers, power converters etc.

In an embodiment, the volume of such electronic subsystems is greater than 0.6 cubic meters, for example more than 1 cubic meter such as more than 2 cubic meters.

In yet a further embodiment, the power to be processed by such electronic subsystems is greater than 100 kilowatts, e.g. greater than 400 kilowatts such as greater than 1 megawatts.

By preassembling at least one of the electronic subsystems onto the tower section and transporting the tower section together with the electronic subsystem, transportation of the wind power plant to the installation site is significantly reduced.

By installing the electronic subsystem onto the tower section, the electronic subsystem is further protected mechanically during transport by means of the tower section and thus does not need further protective material.

Furthermore, the level of the modular design of the wind power plant is increased and the efforts for installing the wind power plant at the installation site is reduced. In effect the time when highly trained personal needs to supervise the installation is further reduced.

At the installation site, according to an embodiment, the tower section is erected including the preassembled electronic subsystems. By that the alignment and calibration of the electron subsystems in the tower section and in the wind power plant is further significantly reduced.

Advantageously more than half of the electronic subsystems are preassembled onto the tower section at the preassembly site. The more electronic subsystems are preassembled onto the tower section at the preassembly site, the easier it is to install the wind power plant at the installation site.

If weight of the components of the wind power plant is an issue during transport, the tower of the wind power plant may be split into plural tower sections, which each are transported separately. At least one of these plural tower sections includes preassembled electronic subsystems.

In an embodiment, at the preassembly side at least two electronic subsystems are interconnected by wiring. Taking this measure, the level of preassembly is further increased. This saves time for installation of the wind power plant. Further, certain testing algorithms to be performed at the installation site become superfluous or become at least more simple.

According to a further embodiment the step of providing the tower section includes providing supporting structures to the tower section. The supporting structures may be used for mechanically attaching the at least one electronic subsystem of the wind power plant onto the tower section. The supporting structures are preferably adapted to provide sufficient mechanical stability for the electronic subsystems during transport and installation such as during the erection of the tower section at the installation site.

In yet a further embodiment, cabinets for at least one electronic subsystem are installed into the tower section at a preassembly site.

An electronic subsystem may include the power electronics of the wind power plant. The power electronics may include a power rectifier or a power DC-AC converter. It may also include instead or in addition a transformer for converting the power as generated by the wind power plant to the external grid.

In yet another embodiment the subsystems include a central control of the wind power plant.

According to an embodiment the tower section of a wind power plant, the tower section comprising a tubular section, at least one electronic subsystem, and support structures, is preassembled and the at least one electronic subsystem is attached to the interior of the tubular section by the support structures, wherein the tower section is transportable.

The term "transportable" in the meaning of this application means that the tower section may be transported by trucks without causing the tower section including the electronic subsystems to be damaged during transport due to its own gravitational weight. This means that the electronic subsystems are sufficiently fixed to the tower section that they remain intact during a conventional transport with trucks.

The tower section may, in an embodiment, further comprise cabinets for receiving the at least one electronic subsystem.

The at least one electronic subsystem may comprise the power electronics of the wind power plants such as a power rectifier, a power DC-AC converter, a power transformer or any combination thereof.

In an embodiment, the tubular section has a diameter of more than 1.5 meters, for example more than 2 meters, in particular of more than 3 meters.

In yet another embodiment, the longitudinal length of the tubular section is more than 2 meters, in particular more than 4 meters, for example more than 8 meters.

The longitudinal length of the tubular section in a yet further embodiment is less than 20 meters, and particular less than 15 meters, for example less than 10 meters.

In another embodiment the weight of the tubular section including the at least one electronic subsystem is more than 2 tons, for example more than 4 tons, such as more than 6 tons. The weight of the tubular section including the electronic subsystems may be less than 18 tons.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein:

FIG. 1 shows an embodiment of a wind power plant 1 including a tower section 2, a generator 18 and rotor blades 17 that are driven by wind 21. The tower section 2 includes a lower and a higher tubular section 11. The lower tubular section 11 has a longitudinal length L of 10 meters. The tubular section 11 of the lower tower section 2 has a diameter D of 3 meters. The lower tubular section 11 has an interior 12 which receives power electronics 7 which are attached to a tower wall 15 of the tubular section 11 with support structures 6. Power electronics 7 include a power rectifier 8, a converter 9, a power transformer 14 and a central control 10 of the wind power plant 1. By means of support structures 6 a first electronic subsystem 3, a second electronic subsystem 4 and a third electronic subsystem 5 are fixed to the tower wall 15. The tower as generated by the wind power plant 1 is transformed by the power transformer 14 and is fed by a power line 19 to an external grid 20.

FIG. 2 shows a schematic drawing of a cross section of the tubular section 11 according to FIG. 1. First electronic subsystem 3, second electronic subsystem 4 and third electronic subsystem 5 are attached to the tower wall 15 by means of support structures 6 which are stable enough to hold these electronic subsystems 3, 4, 5 in place safely during transport of the tubular section 11. Further to the electronic subsystems 3, 4, 5 also the power rectifier 8 and the central control 10 are attached to the tower wall 15. The interior 12 of the tubular section 11 is accessible through a door 16. The first electronic subsystem 3 is the power transformer 14. The second electronic 4 is the power rectifier 8. Electronic subsystems 3, 4, 5 are fit into cabinets 13 to be protected against dust and mechanical impact. The electronic subsystems 3, 4, 5 are rigidly fixed in the interior 12 to the tower wall 15.

FIG. 3 shows a schematic drawing of the tubular section 11 of the wind power plant 1, according to another embodiment, in a perspective view with partial cutouts. The interior 12 of the tubular section 11 is accessible through the door 16. Electronic subsystems 3, 4, 5 are installed at different heights in the tubular section 11 and are placed into cabinets 13. By assembling the electronic subsystems 3, 4, 5 at the preassembling site and transporting the tower section with the installed electronic subsystems 3, 4, 5 to the installation site, the process of installing the wind power plant 1 is considerably facilitated and the time of highly trained personal to be supervising the installation works is significantly reduced as well as overall costs for transporting the wind power plant 1 from the fabrication site to the installation site is considerably reduced.

Figure 1:
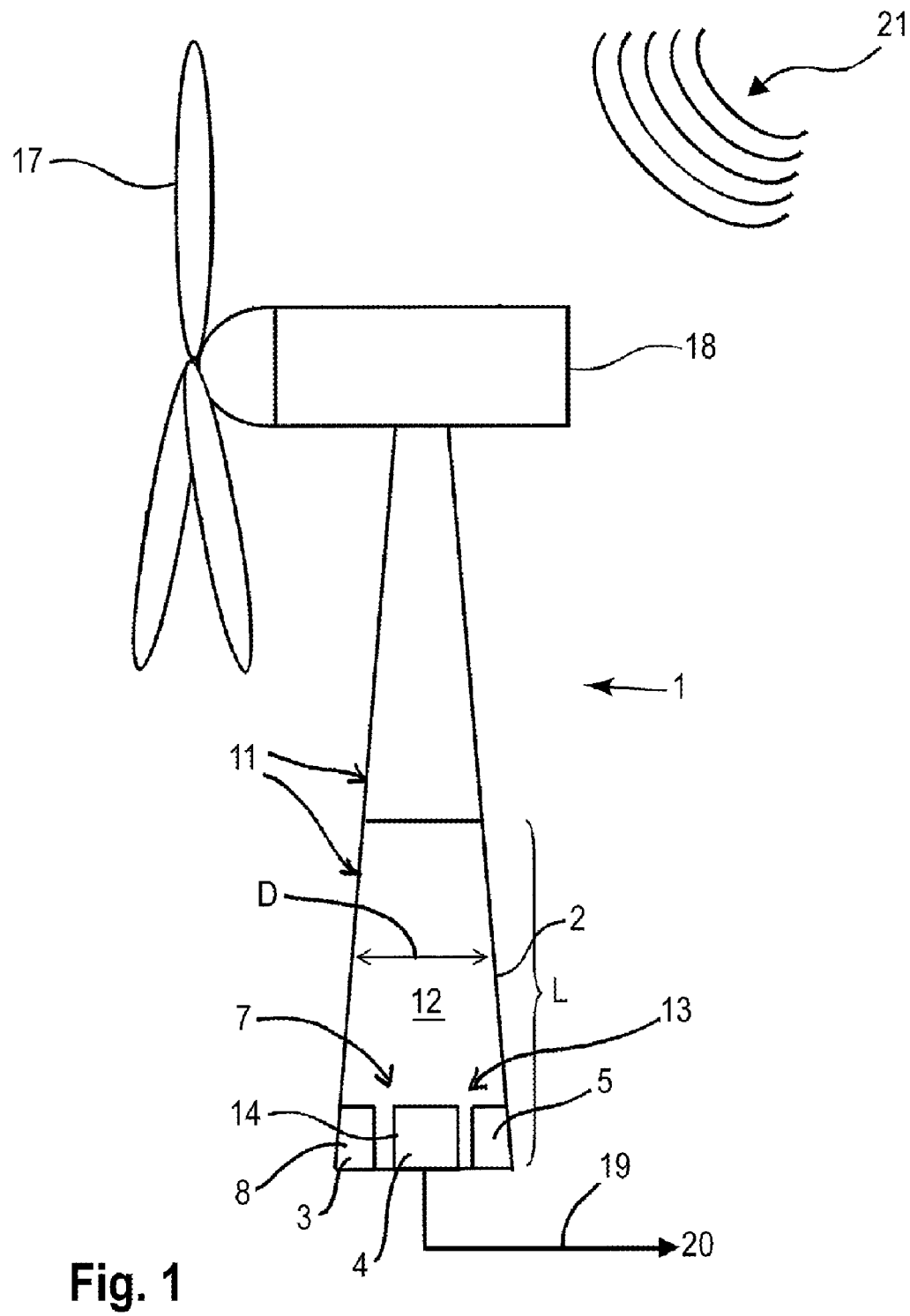
FIG. 1 shows a schematic drawing illustrating a wind power plant from a side view.
Figure 2:
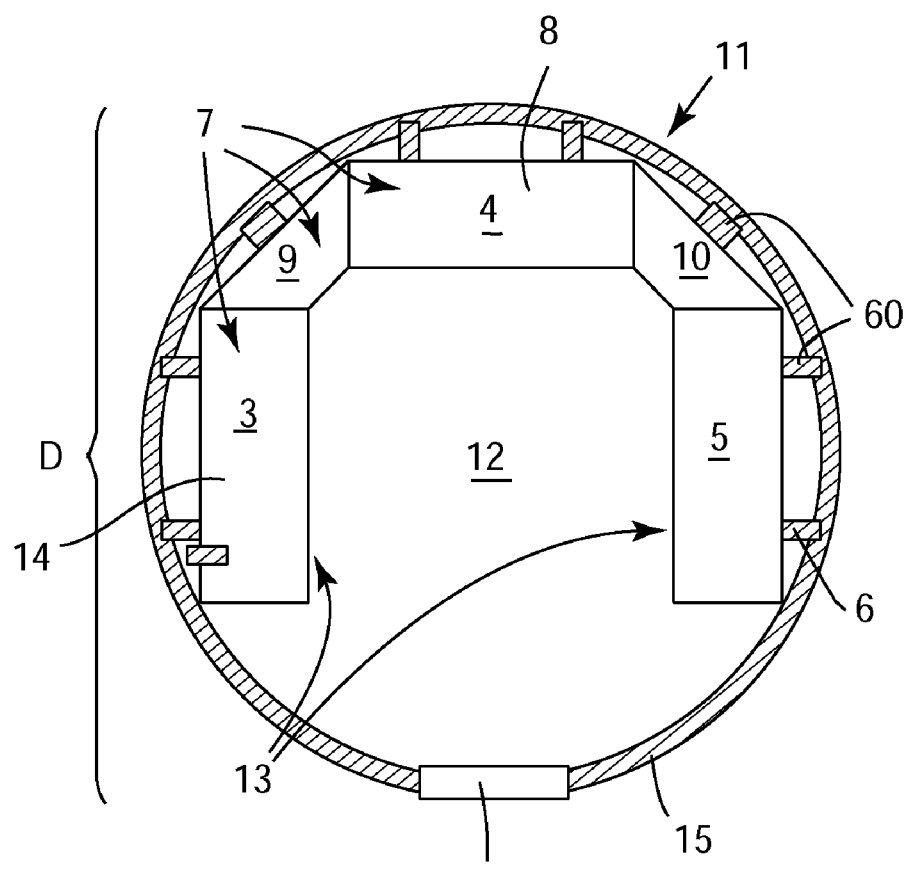
FIG. 2 shows a further schematic drawing illustrating a cross section of a tower section of the wind power plant according to FIG. 1.
Figure 3:
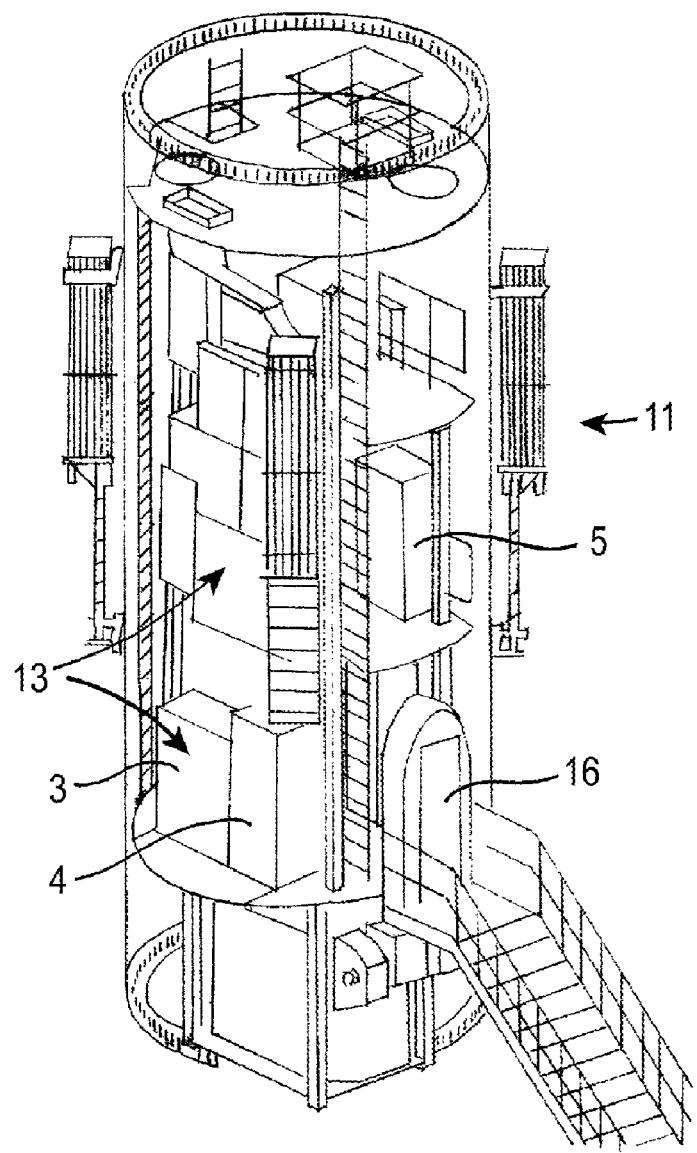
FIG. 3 shows a schematic drawing illustrating a tower section according to another embodiment in a perspective view with partial cutouts.

An embodiment relates to a preassembled tower section 2 of a wind power plant 1 and a method of transporting a tower section 2 of a wind power plant 1, the method comprising the steps: providing the tower section 2 at a preassembly site, preassembling at least one electronic subsystem 3, 4, 5 of the wind power plant 1 onto the tower section 2, transporting the preassembled tower section 2 from the preassembly site to an installation site. In effect transport thereof is considerably simplified and a higher degree of modular design and preassembly is achieved.

What is claimed is:

1. A method of transporting a tower section of a wind power plant, the method comprising the steps of
   providing the tower section at a preassembly site,
   preassembling at least one electronic subsystem of the wind power plant onto the tower section to form a preassembled tower section, and
   transporting the preassembled tower section from the preassembly site to an installation site.

2. The method according to claim 1, further comprising, at the installation site, erecting the preassembled tower section.

3. The method according to claim 1, wherein more than half of the electronic subsystems are preassembled onto the tower section at the preassembly site.

4. The method according to claim 1, wherein, at the preassembly site, at least two electronic subsystems are preassembled onto the tower section.

5. The method according to claim 4, wherein, at the preassembly site, the at least two electronic subsystems are interconnected by wiring.

6. The method according to claim 1, wherein providing the tower section includes providing supporting structures to the tower section.

7. The method according to claim 1, further comprising, at the preassembly site, installing cabinets for the at least one electronic subsystem into the tower section.

8. The method according to claim 1, wherein the at least one electronic subsystem includes power electronics of the wind power plant.

9. The method according to claim 8, wherein the power electronics includes a power rectifier or a power DC-AC converter.

10. The method according to claim 1, wherein the at least one electronic a central control of the wind power plant.

11. Tower section of a wind power plant, the tower section comprising:
- a tubular section,
- at least one electronic subsystem, and
- support structures,
- wherein the tower section is preassembled and the at least one electronic subsystem is attached to an interior of the tubular section by the support structures, and
- wherein the tower section is transportable.

12. The tower section according to claim 11 further comprising cabinets for receiving the at least one electronic subsystem.

13. The tower section according to claim 11, wherein the at least one electronic subsystem comprises power electronics of the wind power plant.

14. The tower section according to claim 13, wherein the power electronics includes a power rectifier.

15. The tower section according to claim 13, wherein the power electronics includes a power DC-AC converter.

16. The tower section according to claim 13, wherein the power electronics includes a power transformer.

17. The tower section according to claim 11, wherein the tubular section has a diameter of more than 2 m.

18. The tower section according to claim 11, wherein the tubular section has a longitudinal length of more than 2 m.

19. The tower section according to claim 11, wherein the tubular section has a longitudinal length of less than 20 m.

20. The tower section according to claim 11, wherein the tubular section has a diameter of more than 3 m.

* * * * *

UNITED STATES PATENT AND TRADEMARK OFFICE
CERTIFICATE OF CORRECTION

PATENT NO. : 7,805,893 B2  Page 1 of 1
APPLICATION NO. : 12/035106
DATED : October 5, 2010
INVENTOR(S) : Scholte-Wassink It is certified that error appears in the above-identified patent and that said Letters Patent is hereby corrected as shown below:

In Column 4, Line 67, in Claim 10, after "electronic", insert -- subsystem includes --.

Signed and Sealed this
Eighth Day of February, 2011

David J. Kappos
*Director of the United States Patent and Trademark Office*